Oct. 6, 1959  G. PARENTI  2,907,623
KINEMATIC CONTROL DEVICE FOR COORDINATE TRACING APPARATUS
Filed July 26, 1956  2 Sheets-Sheet 1

INVENTOR.
Gino Parenti
BY
Richards Geier
ATTORNEYS 2,907,623
Patented Oct. 6, 1959

2,907,623
KINEMATIC CONTROL DEVICE FOR COORDINATE TRACING APPARATUS

Gino Parenti, Rome, Italy, assignor to Soc. p. Az. Ottico Meccanica Italiana e Rilevamenti Aerofotogrammetrici, Rome, Italy Application July 26, 1956, Serial No. 600,222

Claims priority, application Italy November 28, 1955

1 Claim. (Cl. 346—139)

The operation of moving a point in a plane in determined and variable directions—such as for instance when tracing topographical details and contour lines for the production of maps from aerial photographs—is normally performed by imparting upon the point to be moved (consisting of a marker or tracing stylus) simultaneous motions in the direction of the Cartesian coordinates. These motions are imparted by means of appropriate handwheels actuating the lead screws of the coordinate-tracing apparatus, upon the absolute and relative speeds of which depend respectively the speed of motion and direction of the moving point.

When this operation is performed manually it is quite difficult, unless the operator possesses exceptional experience and skill, to time the motions of the two handwheels in such a way as to obtain the desired speed and direction; furthermore, the operator has to use both hands and, for fast movements, considerable physical exertion is required.

The purpose of this invention is to develop a system whereby the movable point can be imparted a movement in a given direction by actuating a single mechanical organ (direction control handwheel) controllable by one hand, the variation of the motion speed being controlled from zero to the maximum value by another organ.

Figure 1:
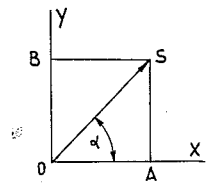

Fig. 1 illustrates the geometrical principle of the device.

The speed of the motion to be imparted upon the $a$ point can be represented by a vector OS, the length of which is proportional to the speed, while the direction and sense are represented by the orientation in the plane of the arrow.

If we call V the length of the segment OS (i.e. the speed) and $\alpha$ the angle which it forms with the axis of the $x$ we find that $V=OS$ can be considered the resultant of two vectors:

$$OA = V \cos \alpha \qquad OB = V \sin \alpha$$

directed respectively in the positive senses of the axis $x$ and $y$.

The purpose of the device described herein is to obtain from a continuous motion of adjustable speed (for instance from a variable-speed drive, or from a motor fitted with a rheostat) a motion of speed depending only upon the motor speed and directed in the plane, with a value of $\alpha$ ranging from 0° to 360°, obtained by dividing the base speed into two other speeds respectively proportional to $\cos \alpha$ and $\sin \alpha$.

It is evident that, considering 0 as the origin of the co-ordinates, the speeds $x$ and $y$ will be positive or negative depending on the quadrant in which the vector OS is located, and namely:

Both positive—when $\alpha$ is between 0° and 90°
$x$ negative $y$ positive—when $\alpha$ is between 90° and 180°
Both negative—when $\alpha$ is between 180° and 270°
$x$ positive $y$ negative—when $\alpha$ is between 270° and 360°

Figure 2:
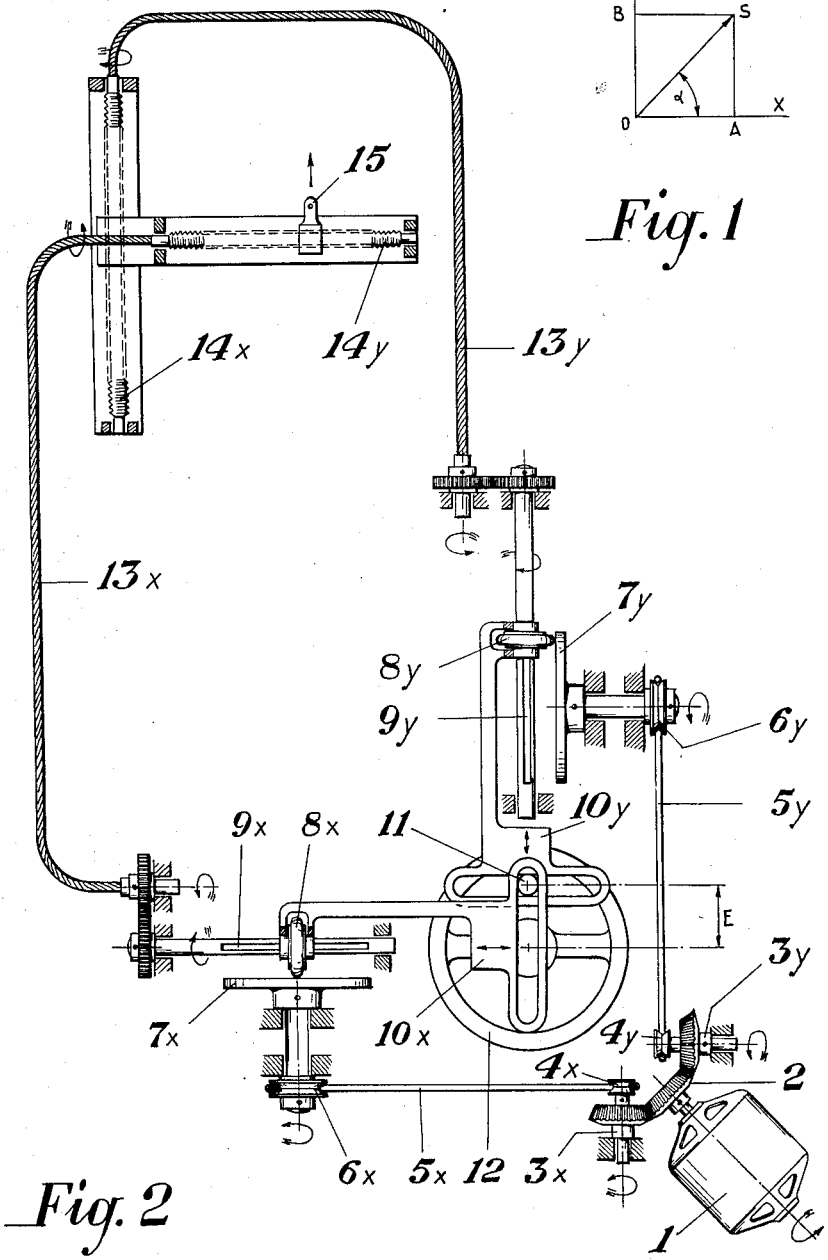

Fig. 2 represents one example of an embodiment of the device according to this invention.

The variable-speed motor 1 drives in motion (at speeds variable from zero to the maximum value), through gear 2, the two gears 3x and 3y which drive the pulleys 4x and 4y. From the latter the motion is transmitted, by means of belts 5x and 5y and of pulleys 6x and 6y, to to the revolving plates 7x and 7y of two perpendicular variable-speed drives.

The rotation speed of each friction wheel 8x and 8y is zero when the wheels are in the center of the corresponding revolving plates 7x and 7y, and is proportional to the distance of the wheel from the center of the plate, and positive or negative depending on the side on which the wheel is placed. The wheels are engaged slidably, by means of keys fitting into a keyway, on shafts 9x and 9y, and their longitudinal position, with respect to the center of the tables 7x and 7y is controlled by means of the slotted arms 10x and 10y, in the slots of which is engaged a single pivot 11 fastened to the direction-control wheel 12, the rotation axis of which passes through the common point of the rotation axis of shafts 9x and 9y.

With this arrangement the travels of each slotted arm 10x and 10y along its axis are equal to the projections of the segment of eccentricity E in the two directions of the shafts 9x and 9y, and since the latter are perpendicular to each other the said projections are equal to the value of the said segment multiplied respectively by the sine and cosine of the angle which forms a reference direction with it. In the case illustrated in the Figure 2, the reference direction is turned upwards, the projection on $x$ is zero and the projection on $y$ is equal to the whole segment of eccentricity.

The speed of rotation of shafts 9x and 9y is transmitted through flexible drives 13x and 13y, or through electro-magnetic drives, or through mechanical drives to the lead screws 14x and 14y of the coordinate-tracing apparatus.

In the particular position shown in Fig. 2, the component $x$ is zero, $y$ is maximum and the movable point 15 moves in the direction indicated by the arrow, which is precisely parallel to the direction assumed by pivot 11 with respect to the axis around which rotates the direction-control handwheel 12. In all positions of the said handwheel, the movement of the movable point 15 always takes place in a direction parallel to that located by the center of the handwheel and by pivot 11, at a speed which depends only upon the speed of the variable-speed motor 1, so that guiding the movable point in the desired direction is a simple and instinctive operation, because the angular variation to be imparted upon the trajectory of the point is the same, in value and direction, to be imparted upon the handwheel.

Figure 3:
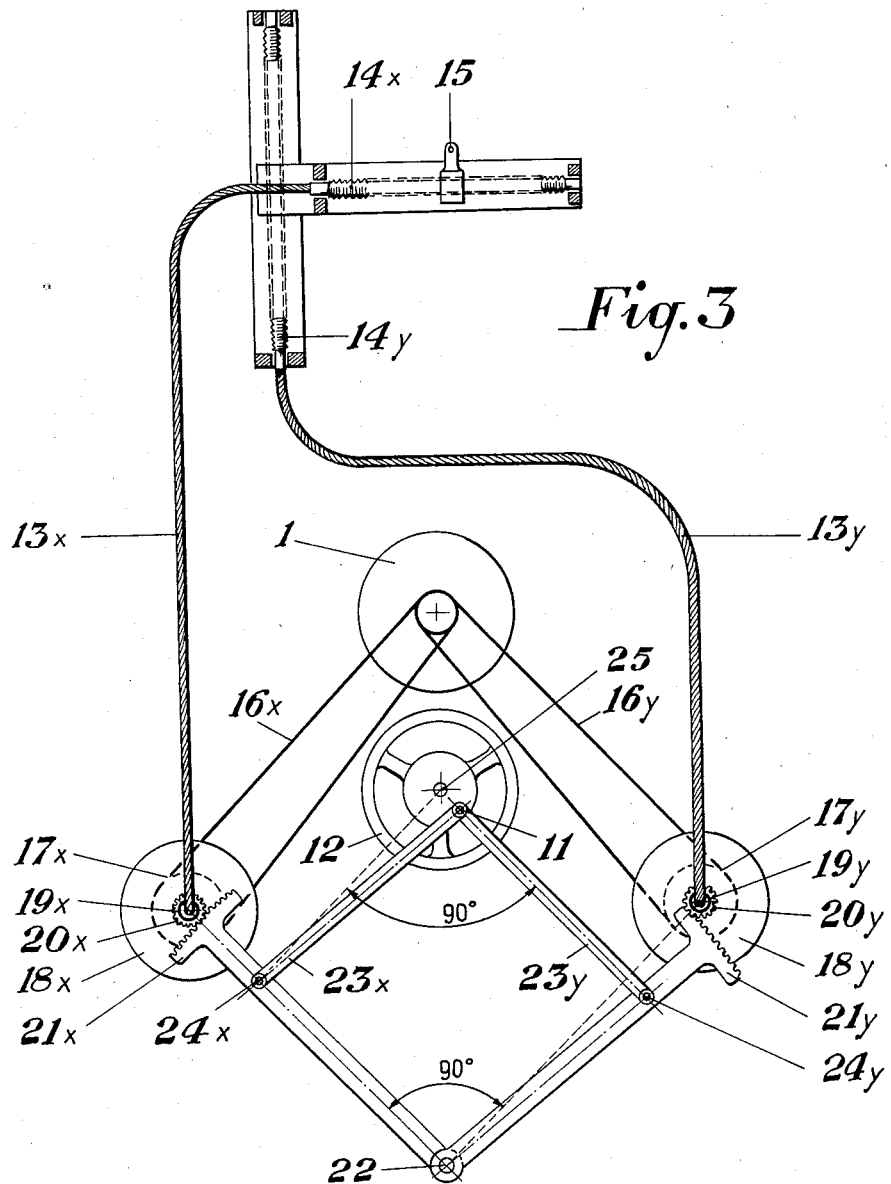

Figure 3 illustrates another example of the embodiment of the device according to this invention, particularly suitable for the use with variable-speed drives, of which various types are available. In these variators the driving and driven (input and output) shafts are coaxial, and coaxial with either of them is also the control shaft, upon the angular position of which depends the input-output speed ratio.

The motor 1 drives, through belts 16x and 16y and pulleys 17x and 17y, the input shafts of the variable-speed drives 18x and 18y, while the motion of the output shafts is transmitted—through flexible shafts 13x and 13y, or electro-magnetic drives or mechanical drives—to the lead screws 14x and 14y of the coordinate-tracing apparatus, the movable point of which (marker or writing stylus) is represented by point 15.

The speed adjustment shafts 19x and 19y of the variable-speed drives 18x and 18y are fitted with the gears 20x and 20y engaged with sector gears 21x and 21y, both pivoted in 22.

Two connecting rods 23x and 23y are pivoted at one end respectively in points 24x and 24y, and at the other end both on pivot 11, which is eccentrically mounted on the direction-control handwheel 12, revolving on shaft 25. The eccentricity of pivot 11 is calculated to obtain, through sector gears 21x and 21y and gears 20x and 20y, the full excursion of speed variation in the drives.

The drives are mounted in such a way that, when either of the sector gears is at half travel (in the case shown in Figure 3, sector gear 21x) and therefore drive 18x is on zero-speed position and screw 14x is not in motion, the other sector is at either end of the travel, i.e. at the maximum speed adjustment to which corresponds the maximum speed of screw 14y.

Lastly, the device is arranged in such a way that the straight lines connecting point 22 with the centers of 19x and 19y form a right angle, and the straight lines connecting point 25 with the centers of 24x and 24y in their median position form likewise a straight angle.

Under these conditions, the rotations of the speed-control shafts 19x and 19y with respect to their zero position are, with a great approximation, proportional respectively to the sine and cosine of the angle described by pivot 11 (and consequently by handwheel 12) with respect to the position shown in Figure 3.

Therefore, in this case too there occurs the condition indicated in the preamble and in the description of the other arrangements, and namely that the speed imparted upon the movable point, being the resultant of two orthogonal speeds proportional respectively to the sine and cosine of a same angle, is constant, depends exclusively upon the speed of the main drive motor and is directed in the plane at the same angle to the reference direction.

What I claim is:

In combination with a coordinate tracing apparatus having two lead screws movable in perpendicular directions, a kinematic control device comprising a motor, two variable speed drives, each of said variable speed drives comprising an input shaft, a speed adjustment shaft and an output shaft, said shafts being interconnected and alined, belt drives operatively connecting said motor with the input shafts of the two variable speed drives, two gears, each of said gears being firmly connected with a separate speed adjustment shaft, two rods, two sector gears, each of said sector gears being integral with and located upon one end of a separate rod and meshing with a separate gear, a single pivot carrying opposite ends of the two rods, two connecting rods, a second pivot carrying one end of one of said two connecting rods and carried by one of the two first-mentioned rods intermediate the ends thereof, a third pivot carrying one end of the other one of said two connecting rods and carried by the other one of the two first-mentioned rods intermediate the ends thereof, a fourth single pivot carrying opposite ends of the two connecting rods, a direction control handwheel, said fourth pivot being eccentrically mounted upon said handwheel, the lines extending between the first-mentioned pivot and the centers of the two sector gears extending at right angles to each other, and the lines extending between the center of said handwheel and the second and third pivots extending at right angles to each other, and means operatively connecting separate output shafts of the variable speed drives with separate lead screws of the coordinate tracing apparatus.

References Cited in the file of this patent

UNITED STATES PATENTS

| 1,701,582 | Mengden | Feb. 12, 1929 |
| 1,873,126 | Hugershoff | Aug. 23, 1932 |
| 2,750,248 | Abraham | June 12, 1956 |

FOREIGN PATENTS

| 384,971 | Great Britain | Mar. 6, 1931 |